US009948695B2

United States Patent
Vale et al.

(10) Patent No.: US 9,948,695 B2
(45) Date of Patent: Apr. 17, 2018

(54) ENABLING DELIVERY OF PROTECTED CONTENT USING UNPROTECTED DELIVERY SERVICES

(75) Inventors: Rajesh J. Vale, Plano, TX (US); Danny De Vleeschauwer, Evergem (BE)

(73) Assignee: Alcatel Lucent, Boulogne-Billancourt (FR)

( * ) Notice: Subject to any disclaimer, the term of this patent is extended or adjusted under 35 U.S.C. 154(b) by 151 days.

(21) Appl. No.: 13/422,447

(22) Filed: Mar. 16, 2012

(65) Prior Publication Data

US 2013/0246803 A1  Sep. 19, 2013

(51) Int. Cl.
| | | |
|---|---|---|
| G06F 12/14 | (2006.01) | |
| H04L 29/08 | (2006.01) | |
| H04L 29/06 | (2006.01) | |
| H04N 21/2347 | (2011.01) | |
| H04N 21/462 | (2011.01) | |
| H04N 21/845 | (2011.01) | |

(52) U.S. Cl.
CPC .......... *H04L 67/06* (2013.01); *H04L 65/4084* (2013.01); *H04L 65/80* (2013.01); *H04N 21/23476* (2013.01); *H04N 21/4622* (2013.01); *H04N 21/8456* (2013.01)

(58) Field of Classification Search
CPC ...................................................... G06F 21/72
See application file for complete search history.

(56) References Cited

U.S. PATENT DOCUMENTS

| | | | |
|---|---|---|---|
| 2003/0204718 A1* | 10/2003 | Connelly et al. | 713/150 |
| 2004/0039924 A1* | 2/2004 | Baldwin et al. | 713/189 |
| 2005/0185918 A1* | 8/2005 | Lowe | 386/46 |
| 2006/0200677 A1* | 9/2006 | Marinescu | 713/182 |
| 2007/0038578 A1* | 2/2007 | Liu et al. | 705/62 |
| 2010/0063984 A1 | 3/2010 | Rossett | |
| 2010/0100952 A1 | 4/2010 | Sample et al. | |
| 2010/0228970 A1* | 9/2010 | Oka et al. | 713/156 |
| 2012/0117659 A1* | 5/2012 | Gearhart et al. | 726/27 |
| 2012/0246485 A1* | 9/2012 | Norimoto et al. | 713/189 |

FOREIGN PATENT DOCUMENTS

| | | |
|---|---|---|
| CN | 1954609 A | 4/2007 |
| CN | 200580019563 | 5/2007 |
| CN | 101751527 A | 6/2010 |
| CN | 102300093 A | 12/2011 |
| JP | 2002-016899 | 1/2002 |
| JP | 2002-312243 | 10/2002 |
| JP | 2004-294474 | 10/2004 |
| JP | 2005229587 A | 8/2005 |
| JP | 2007-116445 | 10/2005 |
| JP | 2006-139335 | 6/2006 |
| WO | 2007118311 | 10/2007 |
| WO | 2011085014 | 7/2011 |

* cited by examiner

*Primary Examiner* — Mohammed Waliullah
(74) *Attorney, Agent, or Firm* — RGIP LLC

(57) ABSTRACT

Disclosed are an apparatus and method configured to perform media file encryption. One example method may include retrieving a media file stored in a memory during a play time operation, executing the media file and receiving additional portions of the media file during the play time operation. The method may also include processing the media file and the additional portions of the media file to generate an output media and displaying the output media on a display of a user device.

14 Claims, 4 Drawing Sheets

ENABLING DELIVERY OF PROTECTED CONTENT USING UNPROTECTED DELIVERY SERVICES

TECHNICAL FIELD

The instant application discloses encrypting a media file, and more specifically encrypting portions of a media file and delivering those encrypted portions to a user device, while other portions of the media file have either already been delivered and/or are being delivered to the end user client prior to the delivery of the encrypted portions.

BACKGROUND

In general, typical data content may be encrypted with a same set of keys for scalability and ease of distribution. The encrypted data content may be delivered with encryption keys stored in a physical media, such as a digital versatile disc (DVD) or streamed to a device. Having one encryption key or encryption system for multiple users (e.g., DVD) enables hackers to concentrate their time, effort and computational power at their disposal to perform cracking the encryption in one copy and apply the same cracking procedure to other copies or even other content that is encoded using the same encryption system. For example, DeCSS is a computer program that was created over a decade ago by a group of hackers. The DeCSS program was capable of decrypting content on a commercially produced DVD. The creation of DeCSS made the video content producer industry vulnerable on a large scale.

System wide vulnerability may be overcome with individual user-specific or individual end-device specific encryption of content. The cost of encrypting the entire content for a specific user or a specific playback end-device is high and as a result user-specific encryption or device specific encryption of content is generally not adopted by content creators. As another known alternative, a popular alternative is to encrypt the content with a single set of keys {K1} [Content] and re-encrypt those keys {K1} with a second set of user-specific or device-specific personalized keys {K2} [{K1}] and deliver those keys to authenticated users/devices. The vulnerability in this example is that a coordinated cracking effort by multiple users can eventually enable cracking of the original keys {K1}. Since the same set of keys {K1} is applied to all copies of the content, once cracked, it can be used to decrypt all such copies without authorization or authentication. If the entire content encrypted with {K1} is delivered to an authenticated device as a file and since {K1} is static, it provides an opportunity for motivated hackers to expand efforts to crack the key {K1}. In order to minimize the chances of cracking the key {K1}, video services rely on a dynamic set of keys. Multiple keys are associated with different sections of the content, and the content is delivered in sections and the end devices maintain a small buffer and have to rely on a streaming mode of delivery. Streaming modes of delivery impose a large demand on the delivery network, especially during busy periods. Such a configuration imposes network capacity to be engineered to satisfy this demand and create multiple instances of non-busy periods with heavily under-utilized network capacity.

Currently, the existing procedure for protecting nonstreaming content is to deliver the content with the corresponding keys along with the data as in DVDs and Blu-ray discs. Over time, this content and encryption key delivery method can be cracked by diligent hackers as has happened to certain Blu-ray systems of encryption. As a result, vendors of premium content seldom rely on this mode of delivery and are encouraged to wait for non-premium windows of opportunity (i.e., 28 days after theatrical release of a movie) to begin using these known methods of encryption. This lack of a protected system to allow private use by individuals leaves a vacuum in the marketplace (i.e., no option to watch content from home on day 1 of theatrical release for any price).

Personalized encryption methods (on the entire content) require large amounts of computing and data bandwidth resources, as dedicated resources are required to perform encrypting and mapping of each copy of data content delivered to each user and the individually encrypted content needs to be transported entirely to the requesting user. Non-personalized homogeneous encryption, while providing easy distribution of content, also provides ample opportunity to hackers to crack the encryption. It would be optimal to have a simple encryption and distribution scheme to provide individualized content protection while reducing the amount of computer resources required for personalized encryption and network resources required for delivery.

SUMMARY

One example embodiment may include a method including retrieving, via a processor, at least one media file from a local memory during a play time operation and executing, via the processor, the at least one media file, and receiving, via a receiver, additional portions of the at least one media file during a play time operation. The method may also include processing, via the processor, the at least one media file and the additional portions of the at least one media file to generate an output media and displaying, via the processor, the output media on a display of a user device.

Another example embodiment may include an apparatus including a receiver configured to receive at least one media file and a memory configured to store the at least one media file. The apparatus may also include a processor configured to retrieve the at least one media file from the memory during a play time operation and execute the at least one media file, and receiving additional portions of the at least one media file during the play time operation. The processor is further configured to process the at least one media file and the additional portions of the at least one media file to generate an output media, and display the output media on a display.

DETAILED DESCRIPTION

Figure 1:
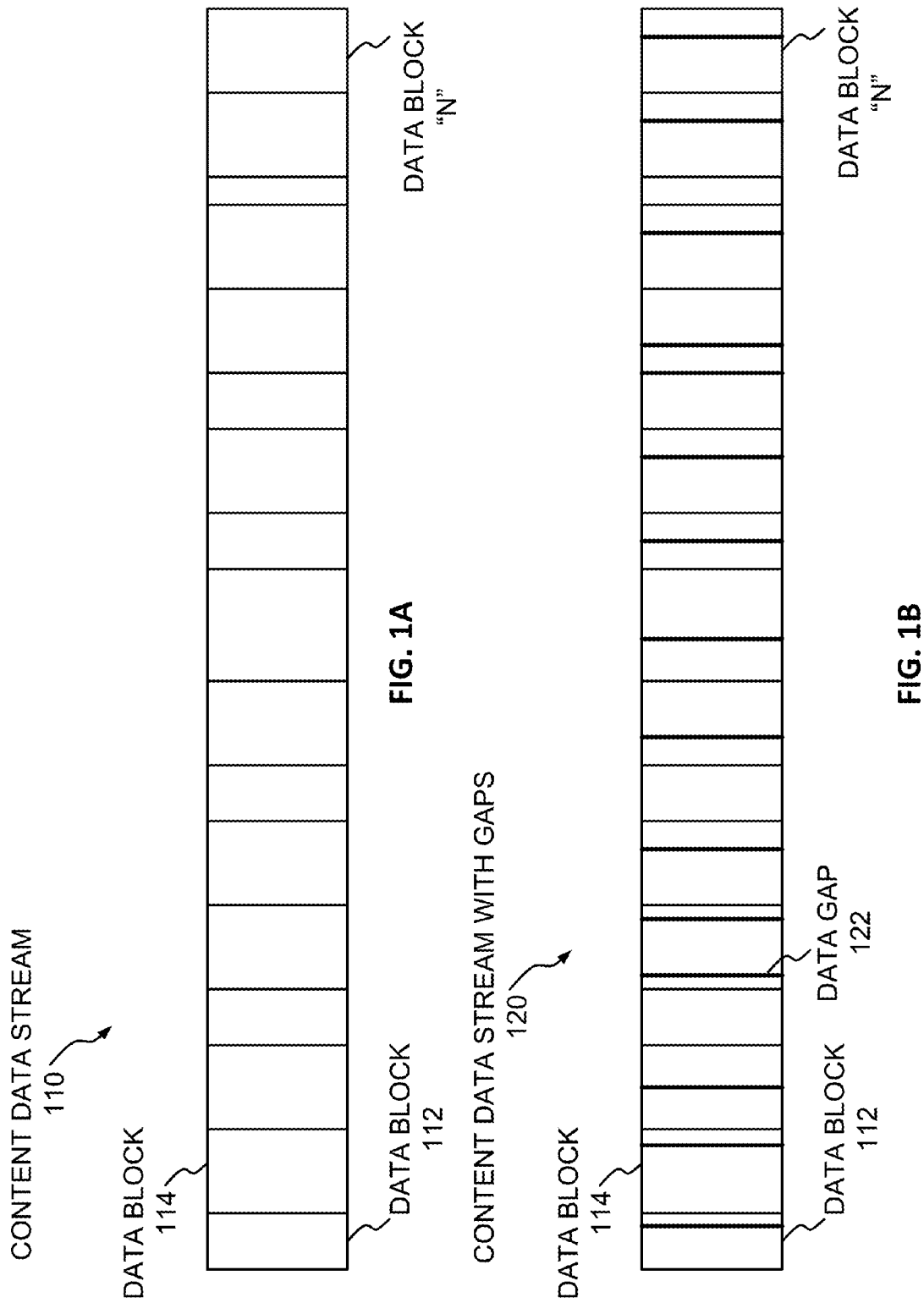
FIG. 1A illustrates an example data stream of data blocks prior to inserting gaps, according to example embodiments.
FIG. 1B illustrates an example data stream of data blocks with gaps inserted, according to example embodiments.

It will be readily understood that the components of the present embodiments as generally described and illustrated in the figures herein, may be arranged and designed in a wide variety of different configurations. Thus, the following detailed description of the embodiments of a method, apparatus, and system, as represented in the attached figures, is not intended to limit the scope of the embodiments as claimed, but is merely representative of selected embodiments.

The features, structures, or characteristics of the described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of the example embodiments of the present disclosure, the embodiments may be applied to many types of network data, such as, packet, frame, datagram, etc. For example purposes, the term "message" also includes packet, frame, datagram, and any equivalents thereof. Furthermore, while certain types of messages and signaling are depicted in exemplary embodiments, which are not limited to a certain type of message, and the embodiments are not limited to a certain type of signaling.

Example embodiments may provide data security and data accessibility protection. Example protection schemes, algorithms, programs and/or hardware devices may provide personalized encryption that enables flexible data delivery schemes which optimize the use of media encryption resources and network bandwidth usage. Example security methods and operations may be applied to any digital content (e.g., documentation, media, operating system data, etc.). However, for example purposes, the examples included in this disclosure will be based on digital video and related digital data content.

According to example embodiments, (a large portion of) data content may be delivered to an intended destination (e.g., user device, content processing server, etc.) ahead of its play-time or access time (e.g., file delivery). By providing the data content ahead of its play-time or access time, delivery may be scheduled ahead of time throughout the day, which increases the corresponding network capacity utilization (e.g., bandwidth utilization, peak operating hours, bottlenecks, etc.). Additional example embodiments may provide authentication of users and/or devices at a scheduled or instant play-time, which may be performed at scheduled intervals allowing less network capacity during play-time. Additionally, the data required to decrypt the encrypted data content may be personalized for a specified user/device making the content difficult to intercept and decrypt on an individual user/device delivery basis. Such a configuration allows for external code integrity mechanisms to be setup that will identify the individual(s)/device(s) attempting to tamper with and/or crack the protective encryption/measures, which would provide a disincentive for computer hackers. Any of the above-noted "devices" may be a computer, laptop, mobile, wireless or cellular phone, a PDA, a tablet, a client, server or any device that contains a processor and/or memory, whether that processor or memory performs a function related to any of the example embodiments.

According to one example embodiment, data content may be queued and organized into a predetermined memory location with inserted data gaps used for added security measures. A select data content (i.e., digital movie or movie segment) may be modified to create a modified data content stream to include digital gaps (e.g., zero bits, null bits, one bits, etc.) in a media file by removing specific portions of the data content such that a decoder will miss critical information needed to decode the media data correctly.

FIG. 1A illustrates an example content data stream 110 that includes various data blocks or segments 112, 114, . . . , N. The data blocks or segments may be apportioned parts of a larger data file (e.g., .MPEG, .AVI, .MOV, etc.), or more specifically a movie file. Prior to creating data gaps in the original content blocks, an original data content file(s) may be recalled from memory and identified or measured in size to determine the number of memory blocks and the overall size of the content to be delivered to a specific user device. The distribution or creation of the gaps could be performed by any computer-based operation that operates by inserting gaps or removing pre-existing content from the original memory blocks. For example, an algorithm may be setup to randomly select memory blocks and/or portions of the blocks that should be removed or discarded to create a gap-filled data content file. The transport of the modified content data can be performed by any network or economical procedure (e.g., multicast, bit torrent, side-load, etc).

FIG. 1B illustrates the same content data stream of FIG. 1A with the data gaps included. Data stream 120 includes the same number of data blocks as the original data stream 110, however, a number of data gaps 122 were added effectively removing portions of data corresponding to each data gap inserted. Each of the data gaps were selected to be unique to the data content and large enough (i.e., 100 kb or larger) so that the data cannot be recreated by brute force workarounds or reverse engineering by hackers. The data gaps 122 may be created by removing predetermined-sized portions of the original data content, and/or by removing portions of the original data content at a fixed interval or randomly throughout the entirety of the original data content. The actual number of bits that fill the gaps (fillers) are generally small enough relative to the original data content size, so that they can be sent from the network contemporaneous with a user device play-time, which may be initiated automatically or by user action. Furthermore, the filler content of the data gaps 122 can be encrypted with user-specific information such that only a user operating a specific account authentication device could view the content.

By inserting the data gaps, the prepared file(s) may be delivered ahead of an intended play-time to a user device (i.e., pre-loaded data) in a physical media, as well as just-in-time delivery for streaming videos. According to one example embodiment, data content pre-loading may be performed by preparing a file or set of files that contains the data content. The file(s) may be prepared by creating specific gaps in the data content as illustrated in FIG. 1B. Although, the decoding process may be personalized for users, the encoding may be common for all users for a particular data file format (H.264, etc.) and resolution (720p, 1080i, 1080p, etc.). The same encoded copy of the data content file with gaps may be delivered for multiple users. An industry standard digital rights management (DRM) or a proprietary DRM decoder could be applied to the data content blocks after the gaps 122 have been created. In another example embodiment, the DRM decoder may be applied before the gaps are created. According to the DRM and/or the decoder requirement the gaps 122 may be replaced by dummy bytes or a metadata representing the exact location of the gaps, which may be made to be part of the prepared media file.

The user device attempting to playback the media file must be connected to the network during playtime and support the file type of the prepared media file. The content data used to fill the data gaps may be delivered at runtime to a connected device. User and/or device authentication may be performed prior to the data content gap filling delivery. The data used to fill the gaps may be encrypted with user-specific information such that only the specific user using the specific device could decrypt the gap filler data after reception. Furthermore, time limits could be set during the encryption procedure when determining the validity of the gap filler data to ensure that a hacker was not setting up an encryption crack effort.

Regarding the gap creation and/or insertion procedures, the data gaps 122 are selected such that the size of the data gaps relative to the size of the media content (i.e., blocks 112, 114 to N) is limited to a suitable fraction of the total data media content to enable real-time delivery of the gap filler content data during playtime on the intended user device. The gap filler content data should not impose large bandwidth loads on the data network used to deliver the gap filler content data used to fill the data gaps 122.

The sizes of the data gaps 122 should be large enough that a brute force recreation of the filler data is computationally not feasible in a realistic timeframe. Without filling the gaps with the exact data, the media data file may be considered to be essentially corrupt, and thus unusable by the decoder. There should be no change required to the decoder as the gap filler data is fetched and set in place when the decoder accesses the gap filler data. As an additional option, the gap filler data can be delivered to the decoder directly in order to reduce the likelihood that any other function or device is capable of accessing the gap filler data. In this example, the decoder should be compatible to perform the various tasks associated with receiving, protecting, buffering and verifying the integrity of the gap filler data. The gap filler data 122 may also be required to include at least some metadata that is used for the decoder to operate properly when decoding the encrypted gap filler data.

The content data can be delivered to the end user with a variety of delivery options provided that the intended content data file(s) with gaps is played back from a compatible media player. The media player could be hardware based or a combination of hardware and software. The media player may require specific modifications to be compatible with the gap filling procedure according to example embodiments. For example, media player compatibility requirements may include one or more of the following examples. The media player should be able to store the prepared file(s) and recognize non-protected metadata associated with the data content. At playback time, the media player should identify that the content is protected by the gap algorithm discussed above and as a result should initiate appropriate contacts with an appropriate network server(s) to acquire rights (DRM) for the media content. The process of acquiring rights may also include user/device authentication, payment and other related options. After the rights are acquired, the media player should attempt to play the content as if it was a normal file using, for example, a byte-stream play out procedure. As a result, there should be a procedure to detect the data gaps from the byte-stream play out, collect information about each gap detected (i.e., location, size, content type, etc.) and fetch the gap filler data for the gaps from a network server. The gap filler data should be fetched at the correct time providing enough time to decrypt the gap filler data and place it in the correct position in the data buffer before the decoder encounters that position in the buffer during a play operation. Also, there should be a security measure that prevents access to the decrypted filler material by any process, function or system within the player other than the decoder.

Figure 2:
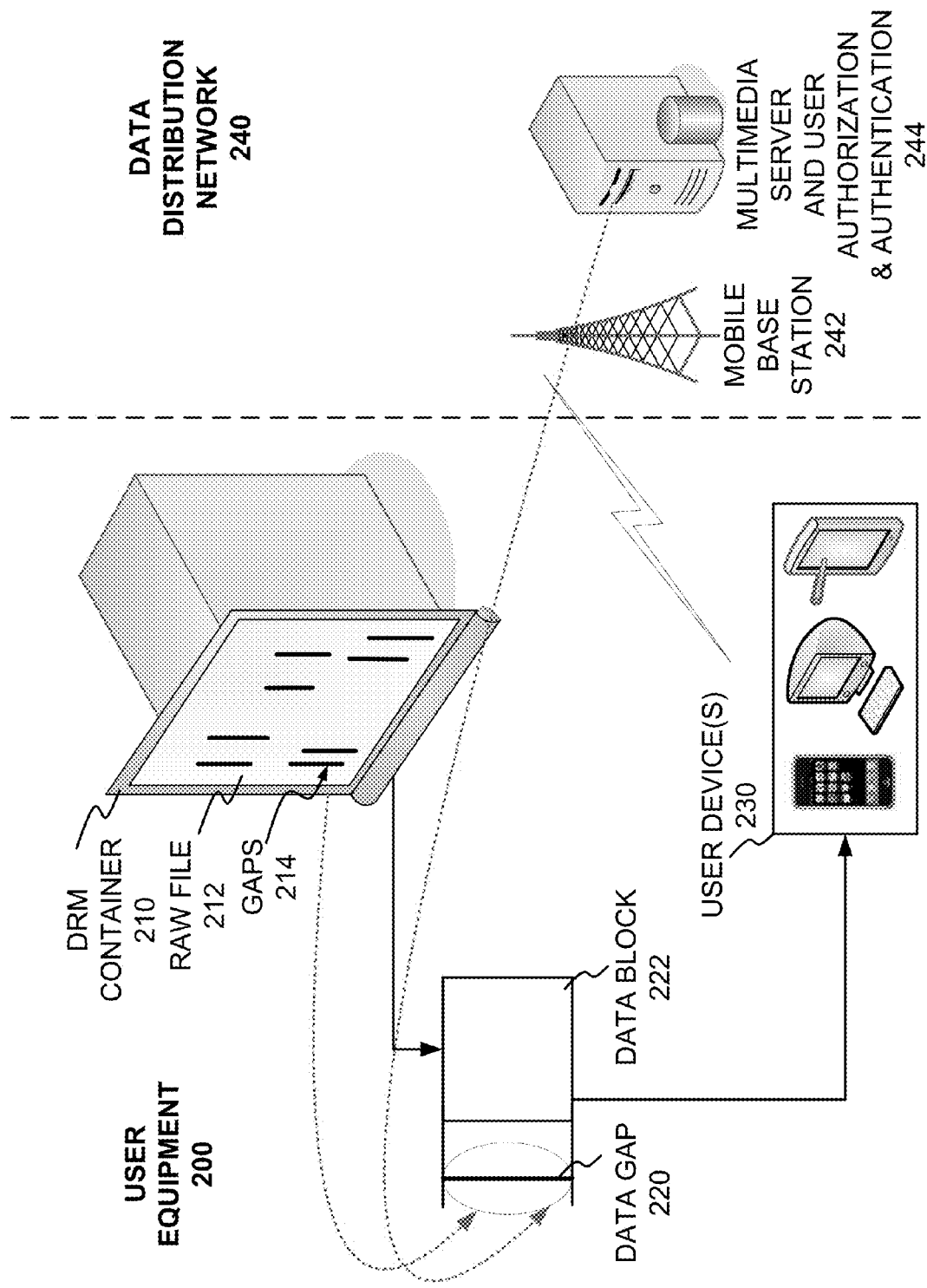
FIG. 2 illustrates an example user device and corresponding data network for delivering media content, according to example embodiments.

FIG. 2 illustrates a user equipment and corresponding communication network configured to perform a sequence of media content encryption operations according to example embodiments. Referring to FIG. 2, a ITU-T Rec. H.264 and/or ISO/IEC 14496-10 (the advanced video coding (AVC) standard) media file may be used as an example video compression formatted video file. The video file may be formatted and/or buffered to be sent to an end user device. Prior to transmitting the video content file, data gaps are inserted by effectively removing portions of the original file content. The file may be protected by third party DRM encryption that is transparent to the gaps. The file may also include an associated metadata that specifically identifies the gaps, such as the number of gaps, the gap locations in the file, the sizes of the gaps, etc. The video content file (that includes the gaps) may be loaded on to a connected user device such as a mobile device, computer, smartphone, laptop, wireless or cellular phone, a PDA, a tablet, a client, server or any device that contains a processor and/or memory.

Referring to FIG. 2, a user equipment 200 illustrates the user device portion of a larger communication network. The network portion may include a data distribution network 240 including a base station 242 and a multimedia server 244 configured to perform user authorization and authentication. The user equipment network 200 includes an end user device 230 (e.g., cell phone, smartphone, computer, laptop, tablet computing device, etc.) that may include hardware and/or software configured to receive, store, buffer and decode a digital media content file. A DRM container 210 may represent an algorithm or processing module as part of the user device 230 and which may initiate the playing of a particular video content file that may have been received via a download operation at an earlier time.

In operation, the user device 230 may initiate the playing of the video content file. A corresponding byte-stream play out sequence of data blocks and other segments of the video content file may be transmitted to a network abstraction layer (NAL) unit unwrapper module (not shown). The NAL unwrapper may parse the video content file for identifiers that would indicate a defined gap. The DRM container 210 may represent a file access algorithm that opens the video content file and identifies the raw video content 212 and the included data file gaps 214. The NAL unwrapper unit may identify the various data file gaps 220 of the data file blocks 222 by parsing the video content file. The identified data file gaps 220 may be reported to a gap file client algorithm that attempts to setup a connection with the data distribution network 240 and receive the gap filler data necessary to decode the video content file.

The data distribution network 240 may receive a request for the gap filler data from the user device 230. The request may include a user device identifier, metadata extracted from the video content file, authentication information, etc. The received request may then be processed and the gap filler data may be retrieved from memory and streamed to the user device 230 as a sequence of gap filler data. The gap filler data may be received by the user device 230 and the DRM processing container 210 may begin populating the video content file with the gap filler data. The gap filler data is reported to a request function that requests a gap fill client to anticipate and serve further requests as the byte-stream play out progresses. An optional run-time DRM that manages the gap filler data may be present. The run-time DRM may access the stored metadata gap information and request further information about the gaps if necessary. The gap fill client may establish a session with the multimedia server 244 and provide user/device authentication etc. needed to receive the gap filler data. The multimedia server 244 sends the gap filler data for the specific gap(s) requested. The gap filler data may be encrypted with user/device specific keys and it may also include an expiration timer function. Optionally, gap specific metadata may be accessed again or updated. The run-time DRM function may decrypt the gap filler data needed to play the media file. If the gap filler data is still encrypted, there may be a function within the NAL unit unwrapper that could decrypt the gap filler data and place it in the correct byte position within the buffer feeding the decoder. The NAL unit must ensure that the gap filler data is inaccessible to any other processes within the device except the decoder.

The general idea of introducing unique gaps that would intentionally corrupt the media file may include withholding information required for decoding the file. A hybrid encryption scheme may be used for encrypting only a small portion of content, such as the gap data with user specific keys while encrypting the larger portion of content (i.e., the remaining data file content) with a homogeneous encryption across all users. The encryption of the data file may use specific supplemental enhancement information (SEI) NAL units or include gap specific metadata along with the data file. The user device may include a client that operates solely to fill the data file gaps at run-time via a run-time DRM that manages the acquisition of the gap fillers at run-time by establishing a session with a network entity to fill the gaps at runtime. The gap fillers may be encrypted with a set of user specific and/or device specific keys while the larger data file is encrypted using a more efficient homogeneous encryption algorithm.

The operations of a method or algorithm described in connection with the embodiments disclosed herein may be embodied directly in hardware, in a computer program executed by a processor, or in a combination of the two. A computer program may be embodied on a non-transitory computer readable storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 3 illustrates an example network element 300, which may represent any of the above-described components of the previous drawings.

Figure 3:
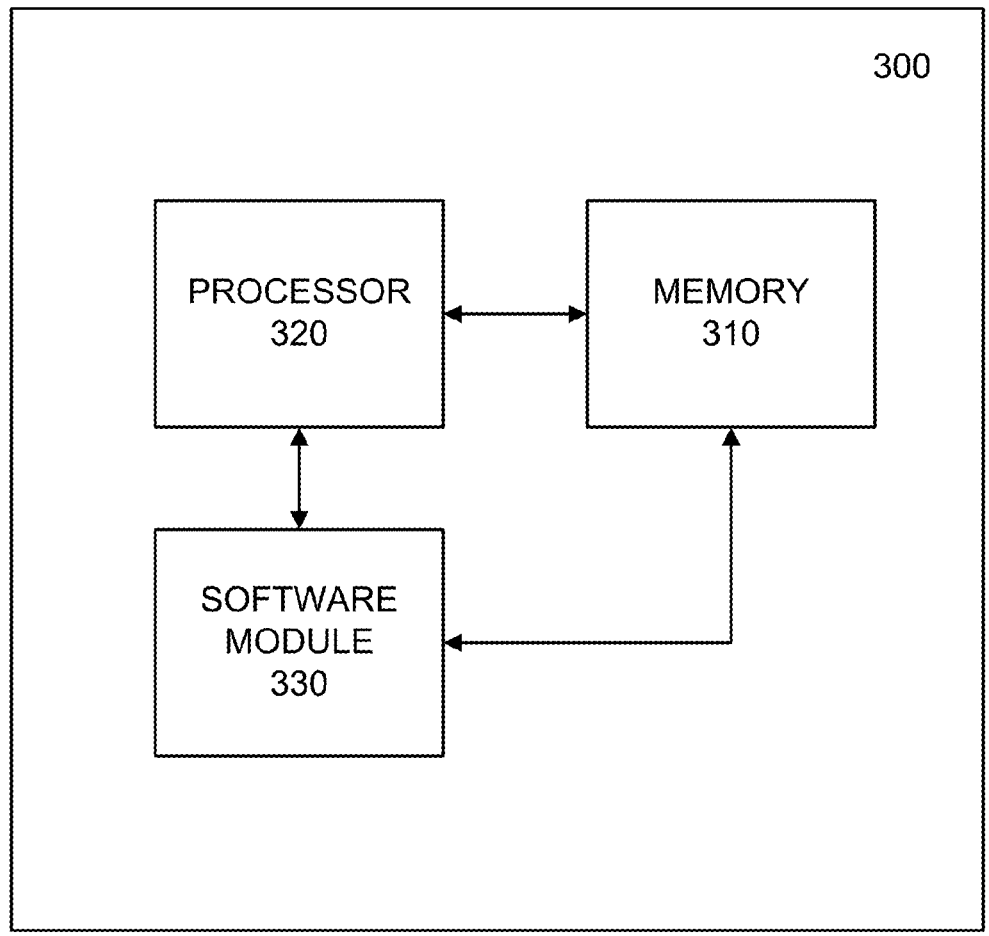
FIG. 3 illustrates an example network entity configured to perform certain operations according to example embodiments.

As illustrated in FIG. 3, a memory 310 and a processor 320 may be discrete components of the network entity 300 that are used to execute an application or set of operations. The application may be coded in software in a computer language understood by the processor 320, and stored in a computer readable medium, such as, the memory 310. The computer readable medium may be a non-transitory computer readable medium that includes tangible hardware components in addition to software stored in memory. Furthermore, a software module 330 may be another discrete entity that is part of the network entity 300, and which contains software instructions that may be executed by the processor 320. In addition to the above noted components of the network entity 300, the network entity 300 may also have a transmitter and receiver pair configured to receive and transmit communication signals (not shown).

Figure 4:
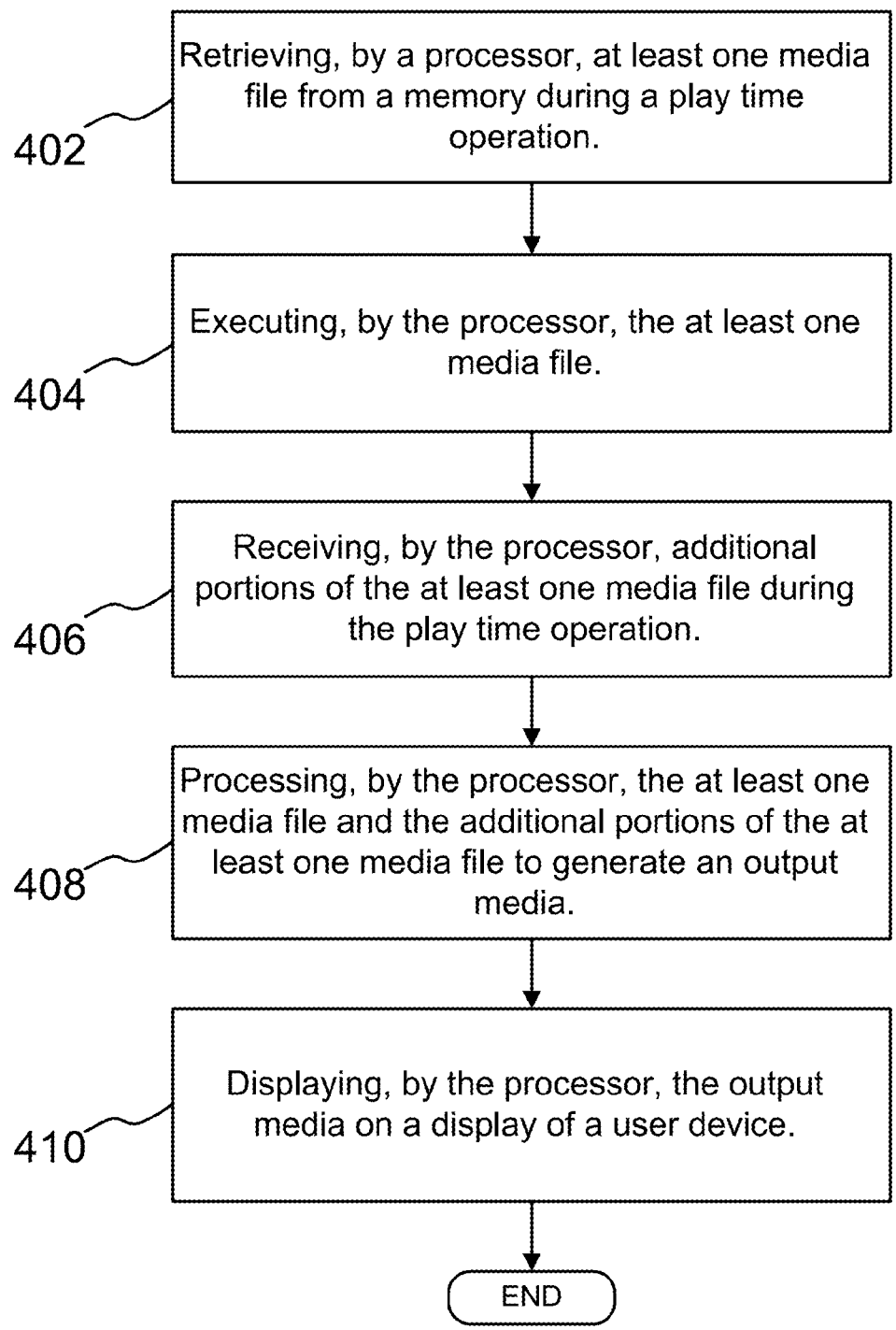
FIG. 4 is a flow diagram of an example method of operation according to an example embodiment.

FIG. 4 illustrates an example flow diagram according to an example embodiment. Referring to FIG. 4, an example method of operation may include various operations including retrieving, by a processor, at least one media file from a memory during a play time operation, at operation 402. The method may also include executing, by the processor, the at least one media file, at operation 404. The method may further include receiving, by the processor, additional portions of the at least one media file during the play time operation, at operation 406, processing, by the processor, the at least one media file and the additional portions of the at least one media file to generate an output media at operation 408, and displaying, by the processor, the output media on a display of a user device at operation 410.

Although an exemplary embodiment of the system, method, and computer readable medium of the present embodiments has been illustrated in the accompanied drawings and described in the foregoing detailed description, it will be understood that the embodiments are not limited to the embodiments disclosed, but is capable of numerous rearrangements, modifications, and substitutions without departing from the spirit or scope of the embodiments as set forth and defined by the following claims. For example, the capabilities of the system of FIG. 2 can be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

While preferred embodiments of the present embodiments have been described, it is to be understood that the embodiments described are illustrative only and the scope of the embodiments is to be defined solely by the appended claims when considered with a full range of equivalents and modifications (e.g., protocols, hardware devices, software platforms etc.) thereto.

What is claimed is:

1. A method of media distribution, comprising:
retrieving, by a processor, at least one media file during a play time operation;
executing, by the processor, the at least one media file;
directing the at least one media file to a network abstraction layer unit unwrapper configured to parse the at least one media file for identifiers of predefined gaps in the at least one media file;

receiving, by the processor, additional portions of the at least one media file during the play time operation based on the identifiers;

processing, by the processor, the at least one media file and the additional portions of the at least one media file to generate an output media; and displaying, by the processor, the output media on a display of a user device; and wherein the additional portions of the at least one media file comprise metadata that includes a first decryption key provided to a plurality of user devices and a second decryption key specific to the user device.

2. The method of claim 1, wherein removing the additional portions of the at least one media file are removed prior to receiving the at least one media file at the user device.

3. The method of claim 1, wherein the additional portions of the at least one media file comprise media content associated with the at least one media file and wherein the metadata is associated with an encryption algorithm used to encrypt the additional portions of the at least one media file.

4. The method of claim 1, comprising:
replacing the predefined gaps in the at least one media file with the received additional portions of the at least one media file.

5. The method of claim 4, wherein the predefined gaps comprise at least one of dummy bytes, all one bits and all zero bits.

6. An apparatus configured to perform media distribution, comprising:
a receiver configured to receive at least one media file;
a memory configured to store the at least one media file; and
a processor configured to
retrieve the at least one media file from the memory during a play time operation and execute the at least one media file,
direct the at least one media file to a network abstraction layer unit unwrapper configured to parse the at least one media file for identifiers of predefined gaps in the at least one media file,
receive additional portions of the at least one media file during the play time operation based on the identifiers, and
wherein the processor is further configured to process the at least one media file and the additional portions of the at least one media file to generate an output media, and display the output media on a display of a user device, and
wherein the additional portions of the at least one media file comprise metadata that includes a first decryption key provided to a plurality of user devices and a second decryption key specific to the user device.

7. The apparatus of claim 6, wherein the additional portions of the at least one media file are removed prior to receiving the at least one media file.

8. The apparatus of claim 6, wherein the additional portions of the at least one media file comprise media content associated with the at least one media file and wherein the metadata is associated with an encryption algorithm used to encrypt the additional portions of the at least one media file.

9. The apparatus of claim 6, wherein the processor is further configured to replace the predefined gaps in the at least one media file with the received additional portions of the at least one media file.

10. The apparatus of claim 9, wherein the predefined gaps comprise at least one of dummy bytes, all one bits and all zero bits.

11. A non-transitory computer readable storage medium configured to store instructions that when executed cause a processor to perform media distribution, the processor being configured to perform:
retrieving at least one media file during a play time operation;
executing the at least one media file;
directing the at least one media file to a network abstraction layer unit unwrapper configured to parse the at least one media file for identifiers of predefined gaps in the at least one media file;
receiving additional portions of the at least one media file during the play time operation based on the identifiers;
processing the at least one media file and the additional portions of the at least one media file to generate an output media; and
displaying the output media on a display of a user device; and
wherein the additional portions of the at least one media file comprise metadata that includes a first decryption key provided to a plurality of user devices and a second decryption key specific to the user device.

12. The non-transitory computer readable storage medium of claim 11, wherein the additional portions of the at least one media file are removed prior to receiving the at least one media file at the user device.

13. The non-transitory computer readable storage medium of claim 11, wherein the additional portions of the at least one media file comprise media content associated with the at least one media file and wherein the metadata is associated with an encryption algorithm used to encrypt the additional portions of the at least one media file.

14. The non-transitory computer readable storage medium of claim 11, wherein the processor is configured to perform:
replacing the predefined gaps in the at least one media file with the received additional portions of the at least one media file, and wherein the predefined gaps comprise at least one of dummy bytes, all one bits and all zero bits.

* * * * *